United States Patent [19]

Godfrey

[11] Patent Number: 5,060,225
[45] Date of Patent: Oct. 22, 1991

[54] PHASE MODULATED OPTICAL CARRIER DATA LINK FOR A FOCAL PLANE ARRAY

[75] Inventor: Maureen A. Godfrey, West Hills, Calif.

[73] Assignee: Hughes Aircraft Company, Los Angeles, Calif.

[21] Appl. No.: 270,181

[22] Filed: Nov. 14, 1988

[51] Int. Cl.$^5$ .................... H04J 14/00; G02F 1/00
[52] U.S. Cl. .................. 359/124; 340/870.28; 340/870.18; 359/115; 359/154; 359/190; 359/191
[58] Field of Search .............. 370/3, 1; 455/605, 608, 455/611, 613, 603, 617; 340/870.28, 870.29, 870.25, 870.18; 331/65, 66

[56] References Cited

U.S. PATENT DOCUMENTS

| | | | |
|---|---|---|---|
| 3,676,684 | 7/1972 | De Lange | 455/609 |
| 3,699,445 | 10/1972 | Kinsel | 455/611 |
| 3,699,463 | 10/1972 | Stone | 455/615 |
| 3,731,103 | 5/1973 | O'Meara | 455/611 |
| 3,875,400 | 4/1975 | Pao et al. | 455/611 |
| 3,899,430 | 8/1975 | Ancker-Johnson . | |
| 3,956,626 | 5/1976 | Ross | 455/611 |
| 4,012,633 | 3/1977 | Huntley | 340/870.29 |
| 4,338,627 | 7/1982 | Stapleton . | |
| 4,390,974 | 6/1983 | Siems . | |
| 4,525,687 | 6/1985 | Chemla et al. . | |
| 4,683,448 | 7/1987 | Duchet et al. . | |
| 4,710,770 | 12/1987 | Hakata et al. | 340/870.18 |
| 4,719,412 | 1/1988 | d'Hemieres et al. . | |

OTHER PUBLICATIONS

"Homodyne Demodulation Scheme for Fiber Optic Sensors Using Phase Generate Carrier", IEEE Journal of Quantum Electronics, vol. QE-18, No. 10, Oct. 1982.
"Synthetic-Heterodyne Interferometer Demodulation", IEEE Journal of Quantum Electronics, vol. QE-18, No. 4, Apr. 1982.

Primary Examiner—Donnie L. Crosland
Attorney, Agent, or Firm—William J. Streeter; Wanda K. Denson-Low

[57] ABSTRACT

A phase modulated optical carrier signal is coupled through at least one optical fiber 20 to a signal processor 13, the optical carrier signal being phase modulated within an electro-optic device by signals generated by a focal plane array of radiation detectors 12. Disclosed are a redundant optical link operating in the time domain, an optical link which employes wavelength division multiplexing in the time domain and an optical link which employes wavelength division multiplexing in the frequency domain. A phase modulator 70 is readily adaptable to at least two signal processing methodologies inlcuding a phase locked loop homodyne detection scheme and a synthetic heterodyne detection scheme, both detection schemes operating at quadrature. The phase modulator is a Mach Zehnder type interferometer operated in a push-pull configuration to achieve a two-fold increase in phase modulation.

37 Claims, 7 Drawing Sheets

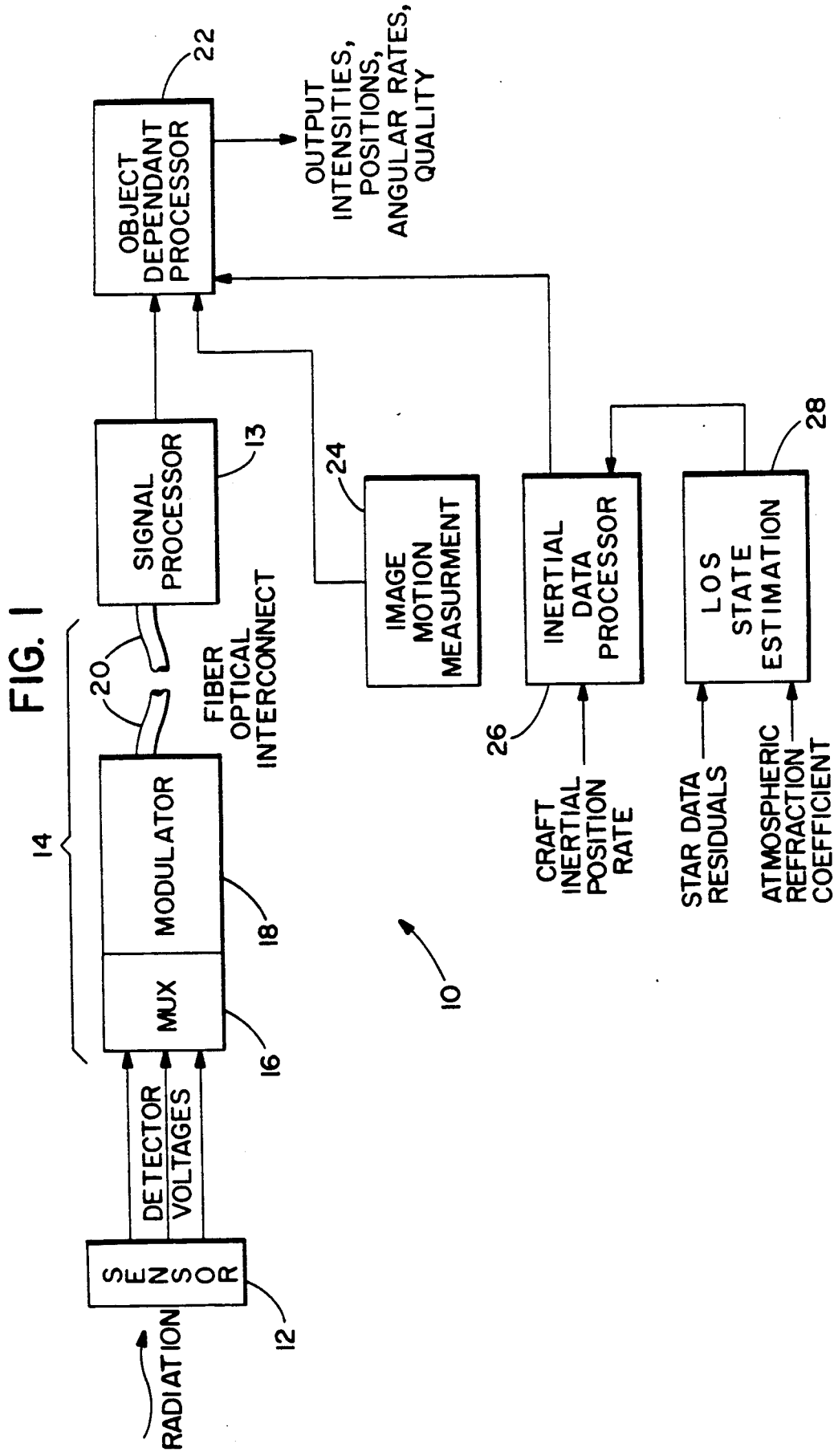

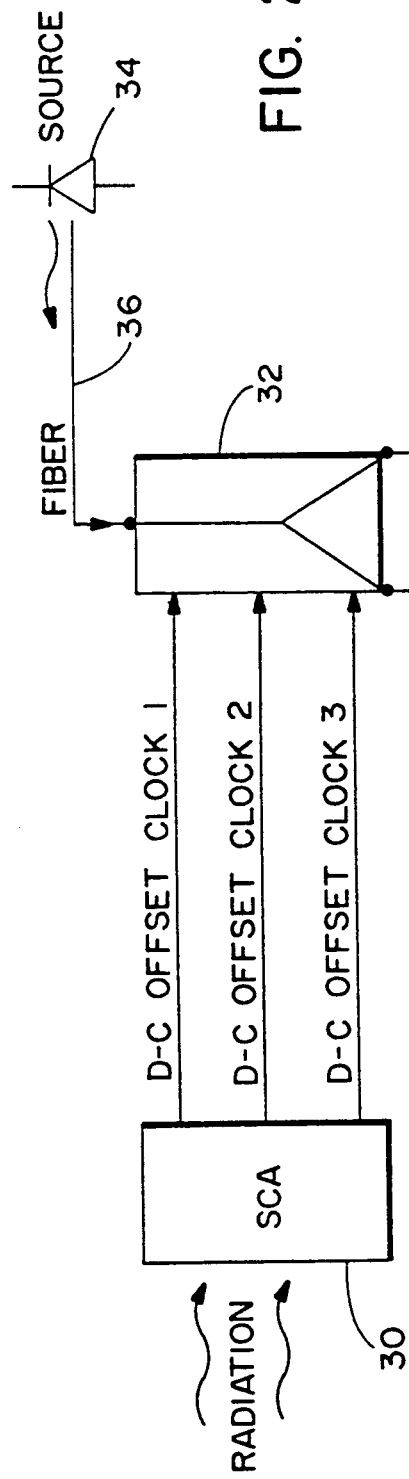
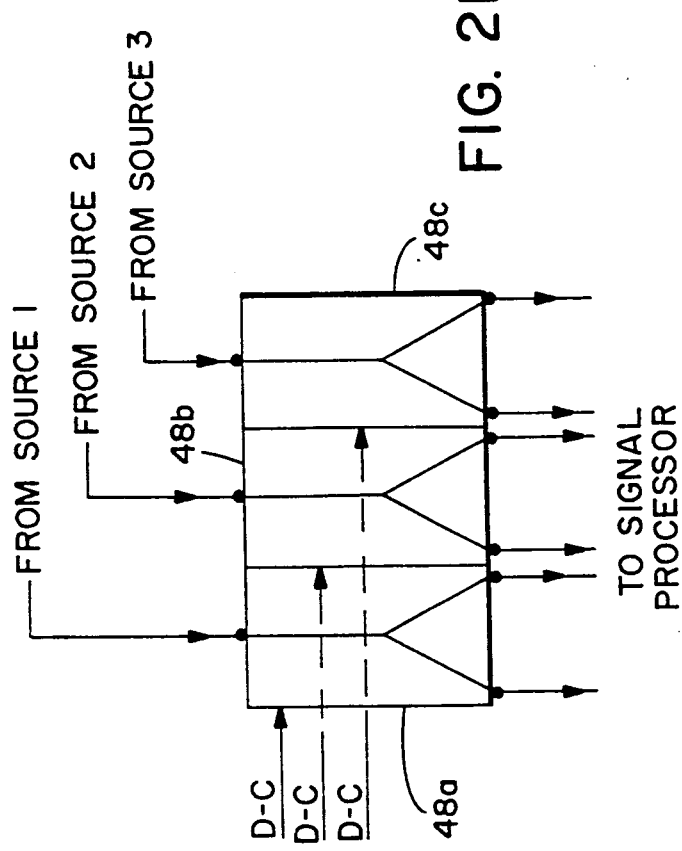
FIG. 2a
FIG. 2b

FIG. 5
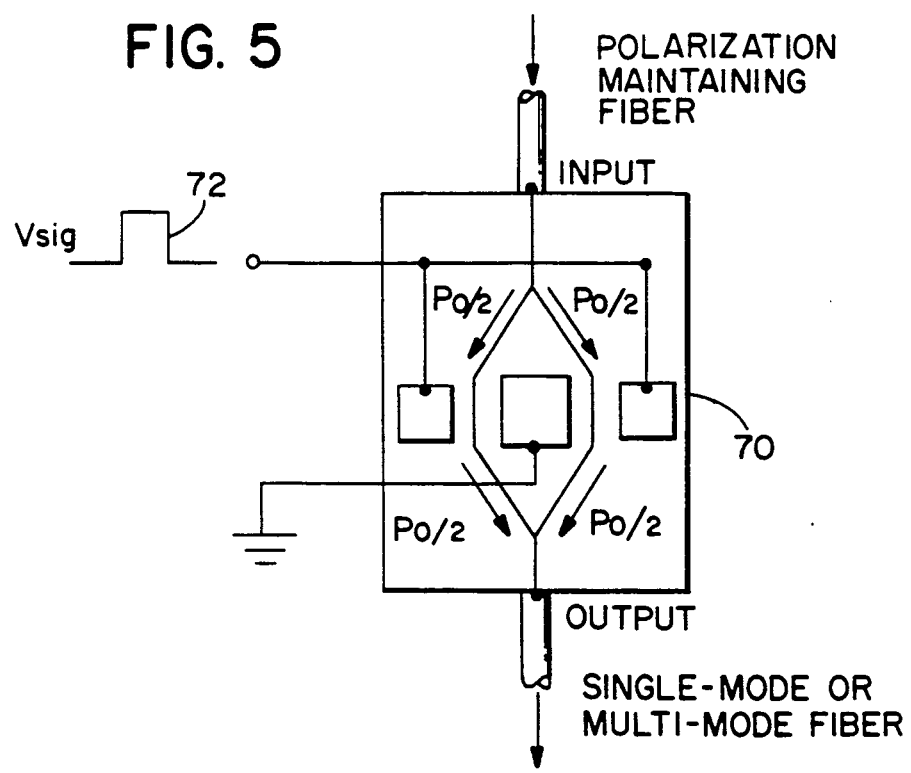
FIG. 6a
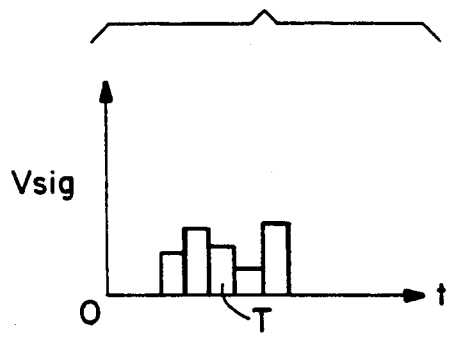
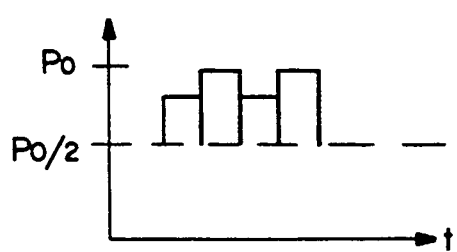
FIG. 6b
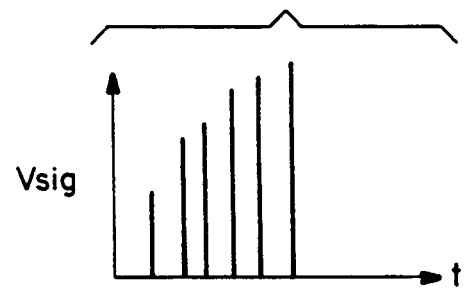
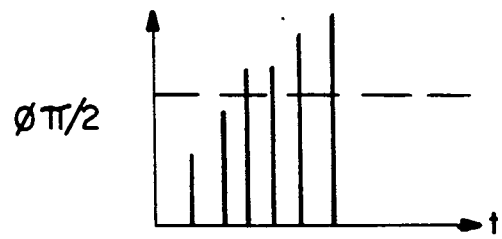
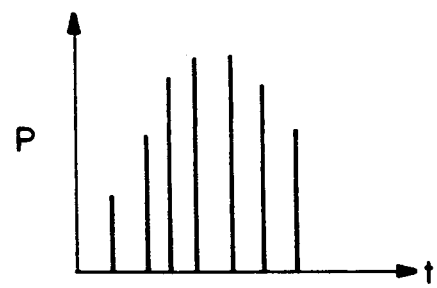

SYNTHETIC HETERODYNE DEMODULATION

HOMODYNE DEMODULATION

PHASE MODULATED OPTICAL CARRIER DATA LINK FOR A FOCAL PLANE ARRAY

FIELD OF THE INVENTION

This invention relates generally to imaging systems and, in particular, to a modulated optical carrier signal which is coupled through at least one optical fiber to signal processing electronics, the optical carrier signal being phase modulated within an electro-optic device by signals generated by a high resolution focal plane array of radiation detectors.

BACKGROUND OF THE INVENTION

Densely populated, high resolution arrays of radiation detectors are typically cooled during use to cryogenic temperatures. This requires that a large number of array generated analog signals be coupled out of the cryogenically cooled stage to an analog signal processor. This analog signal processor is normally maintained in a relatively much warmer environment than the detector array and in fact may generate a substantial amount of heat during its operation. Conventional imaging systems typically employ a plurality of electrical conductors to couple the array signals out of the cold stage.

It has been found that such conventional coupling techniques introduce several significant problems into the design and subsequent operation of high resolution imaging systems. One problem is related to the limited bandwidth of electrical conductors, resulting in a requirement that a large number of electrical conductors be employed. This results in added weight, crosstalk between conductors and an increase in the overall noise budget of the system. Electrical conductors also have inherent length limitations at the relatively high frequencies and low amplitudes of typical array signal outputs, resulting in the requirement that the signal processing electronics be positioned relatively near to the cold stage. This in turn increases the heat load of the cold stage. Furthermore, these inherent disadvantages of electrical conductors militate against the provision of spatially distributed and redundant signal processing electronics. That is, to provide redundant processing nodes requires a corresponding increase in the number of electrical conductors, thereby increasing at least the noise threshold, weight and heat load of the system.

In that such high resolution imaging systems are often employed on aircraft and satellite platforms it can be realized that an overall reduction in system weight, heat and electrical noise are objects of the invention. A further object of the invention is the provision of a capability to readily achieve a high degree of imaging system reliability, such as that achieved through the use of distributed and redundant signal processing nodes or through the use of redundant signal paths between the imaging array and a signal processor.

SUMMARY OF THE INVENTION

The foregoing problems are overcome, the objects of the invention are achieved and other advantages are realized in an imaging system constructed and operated in accordance with apparatus and methods of the invention. In accordance with the invention there is disclosed a phase modulated optical carrier signal which is coupled through at least one optical fiber to signal processing electronics, the optical carrier signal being phase modulated within an electro-optic device by signals generated by a focal plane array of radiation detectors. Several embodiments of an optical link of the invention include a redundant optical link operating in the time domain, an optical link which employs wavelength division multiplexing in the time domain and an optical link which employs wavelength division multiplexing in the frequency domain. A phase modulator of the invention is readily adaptable to at least two signal processing methodologies. These are disclosed to be a phase locked loop homodyne detection scheme and a synthetic heterodyne detection, or phase tracking, scheme, both detection schemes operating at quadrature.

Further in accordance with the invention there is disclosed a phase modulator for modulating a phase component of a substantially sinusoidal optical carrier signal in accordance with an input signal generated by a radiation detecting array. The phase modulator includes a substrate comprised of electro-optic material and an interferometer fabricated on a surface of the substrate. The interferometer includes an optical waveguide having a substantially linear input portion having an exterior end and an interior end, the input portion coupling an optical carrier signal into the interferometer. The interferometer further includes a substantially linear output portion having an interior end and an exterior end, the input and output portions being substantially colinear one with the other. The interferometer further includes a substantially hexagonal portion interposed between the interior ends of the input and output portions, the hexagonal portion having one corner coupled to the interior end of the linear input portion and an oppositely opposed corner coupled to the interior end of the linear output portion. Also disposed on the substrate and forming a part of the interferometer is at least one signal ground electrode disposed within a perimeter of the hexagonal portion and at least one pair of signal electrodes individual ones of which are disposed on opposite sides of the hexagonal structure such that the signal ground electrode is disposed between the pair of signal electrodes, each of the signal electrodes being coupled in common to at least one output signal generated by a radiation detector. In accordance with one aspect of the invention, the interferometer is operated in push-pull to achieve an increase in phase modulation for a given input signal magnitude.

BRIEF DESCRIPTION OF THE DRAWINGS

The foregoing and other aspects of the invention will be made more apparent in the following Detailed Description of the Invention read in conjunction with the attached Drawing, wherein:

FIG. 1 is a block diagram of an imaging system 10 having an embodiment of the invention;

FIG. 2a shows in block diagram form the coupling of voltage outputs from a SCA module to a signal processor via an electro-optic device and an optical fiber transmission cable;

FIG. 2b shows an alternate coupling methodology wherein each SCA voltage output is coupled to an associated electro-optic device;

FIG. 5 shows a Mach Zehnder interferometer for modulating a sinusoidal optical source in accordance with the magnitude of a FPA voltage output;

FIGS. 6a and 6b are graphical depictions of the operation of the interferometer of FIG. 5;

DETAILED DESCRIPTION OF THE INVENTION

Figure 3:
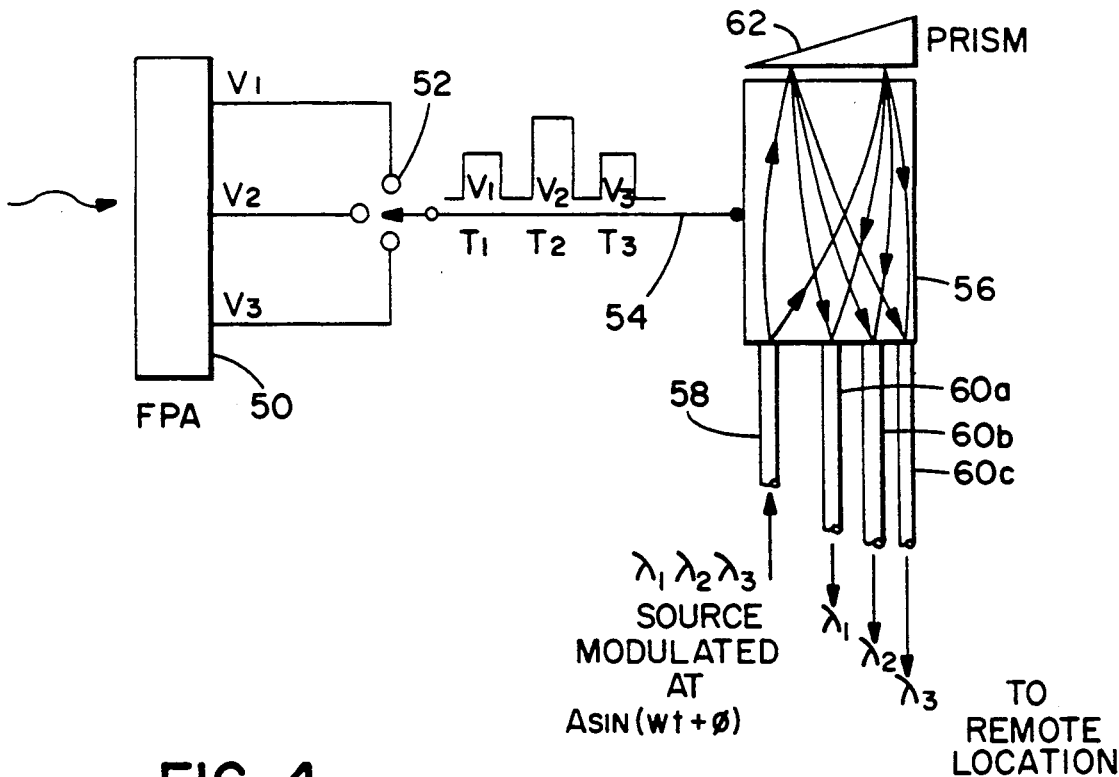
FIG. 3 is a block diagram showing an optical multiplexer coupled to voltage outputs of a focal plane array, the multiplexer accomplishing a wavelength division multiplexing of the voltage signals in the time domain.

Referring now to FIG. 1 there is shown a block diagram of an image processing system 10 constructed and operated in accordance with the invention. System 10 includes a radiation sensor 12 which typically comprises a focal plane array of radiation detectors and a cryrogenically cooled stage with associated optics. A plurality of detector voltage potentials, having magnitudes which are a function of the radiation flux incident on the sensor 12, are output from the sensor 12, typically in a scanned or time multiplexed manner. In conventional imaging systems these detector voltages are coupled via electrical conductors directly to a signal processor 13 wherein the voltages are analyzed. As has been previously stated, there are a number of significant disadvantages related to this conventional signal coupling technique.

In accordance with the invention the detector voltages are coupled to the signal processor 13 via an optical link 14 which comprises, in one embodiment of the invention, a multiplexer 16, an optical modulator 18 and at least one fiber optical cable 20. In that the fiber optical cable 20 may have a length of up to one kilometer it can be appreciated that the signal processor 13 may be physically located a substantial distance from the cryogenic stage. Furthermore, due to the wide bandwidth of the optical cable and the inherent low noise characteristics, as compared to an electrical conductor, a substantial reduction in both weight and system electrical noise are achieved. The optical link 14 will be described in greater detail below.

System 10 may further comprise as components an object dependant processor 22 having a plurality of image/object related outputs such as output intensities, positions, angular rates and an overall image quality indicator. Inputs to the object dependent processor 22 may include an input from the signal processor 13, an input from an image motion measurement processor 24 and an input from an inertial data processor 26. Inertial data processor 26 has as inputs a craft inertial position rate and an output from a Line of Sight (LOS) state estimator 28 which in turn receives data relating to star data residuals and atmospheric refraction coefficients. It should be noted that these further components of the system 10 are shown to place the optical link 14 of the invention in a readily understood technological context and that these further components do not form a part of the invention per se. It should also be pointed out that the optical link of the invention is not restricted for use with only a system constructed as shown in FIG. 1 but that the invention may be beneficially employed in a number of different types of imaging systems.

Several embodiments of the optical link 14 of the invention will now be described. These embodiments include a redundant optical link operating in the time domain, an optical link which employs wavelength division multiplexing in the time domain and an optical link which employs wavelength division multiplexing in the frequency domain.

Referring now to FIG. 2a there is shown as an illustrative embodiment of the invention a redundant optical link operating in the time domain which couples the outputs of radiation detectors to a signal processor. Specifically, a Sensor Chip Assembly (SCA) 30 comprises two offset grids of 64 rows of active radiation detector columns. The radiation detectors may be responsive to infrared (IR) radiation and may be comprised of HgCdTe or other Group II–VI compounds. It should be realized however that the invention is not limited for use with only this type of detector and that the teaching of the invention is equally applicable to detectors comprised of, for example, silicon or Group III–V material. Each column contains circuitry operable to perform correlated double sampling and signal differencing. During the operation of the SCA 30 a plurality of clock signals and bias voltages are provided thereto. In general, four of the SCAs 30 comprise a module while 12 modules comprise a bar.

The embodiment of FIG. 2a couples the time multiplexed outputs of the SCA 30, denoted by the DC offset signals corresponding to Clock 1, Clock 2 and Clock 3 at sample time i ($T_i$), to an optical waveguide phase modulator. The phase modulator comprises an electro-optic device 32, which may comprise lithium niobate, which further serves as a mixer. In this embodiment of the invention device 32 is constructed to function as a 50—50 Y-junction optical coupler/splitter. A sinusoidal optical source 34 provides a frequency modulated optical carrier to an optical fiber 36, the sinusoidal source 34 being repetitively pulsed at a rate t related to the frequencies of the Clock 1, Clock 2 and Clock 3 signals which sequentially apply the DC output signals from the SCA 30 to the device 32. The carrier generated by source 34 has a frequency given by the expression $$e = A\sin(\omega t + \phi) \quad (1)$$

where $\phi$ is the phase component.

The DC offset signals output from the SCA 30 superimpose on the phase component of the carrier due to action of the electro-optic device 32. This results in the DC voltage offset information, which is a function of the radiation flux incident on the detectors of the SCA 30, being carried on the side bands of the modulated carrier in the phase term.

The modulated carrier, having the SCA outputs impressed thereon, is redundantly conveyed by a pair of optical fibers 38 and 40 to a pair of detectors 42 and 44, respectively. As will be shown below the detectors 42 and 44 are preferably matched to the characteristics of the source 34 and the fiber 38 and 40 responsivities at a data rate corresponding to the clocked SCA outputs. Synchronous detection of the carrier modulation envelope is performed whereby the FPA DC offset information is recovered from the carrier, the DC offset information being provided to a signal processor 46 for analysis. Although in FIG. 2a the fibers 38 and 40 are shown redundantly coupling the FPA output to a single signal processor it should be realized that each fiber could be coupled to a separate signal processor. Thus, the invention readily provides for system redundancy by providing redundant data paths to a single signal processing device and/or data paths to redundant signal processing devices.

Referring to FIG. 2b there is shown an alternate embodiment of the optical link of FIG. 2a wherein the source is not pulsed and hence is not time shared by the SCA outputs. In this embodiment each DC offset signal is coupled to an associated phase modulating Y-coupler device 48a, 48b and 48c. Each device has a pair of redundant outputs coupled to associated matched detectors and a signal processor, as shown in FIG. 2a.

In the embodiments of FIGS. 2a and 2b the source 34 may be a super luminescent diode (SLD) device having an output wavelength of approximately 820 nm. The optical fiber is then preferably a single mode type of fiber having a bandwidth greater than 3 GHz-Km. The fiber is also preferably polarization maintaining, at greater than 6 GHz-Km. For the SLD source the detectors 42 and 44 are preferably comprised of GaAs. Alternatively, the source 34 may be a light emitting diode (LED) device having an output wavelength of approximately 1300 nm. The optical fiber type is then preferably a 1.3 germanium doped single mode fiber having a bandwidth in excess of 10 GHz-Km. The detectors 42 and 44 may comprise HgCdTe or InSb. If increased source power is desired the source may be comprised of a YAG pumped laser diode.

Figure 4:
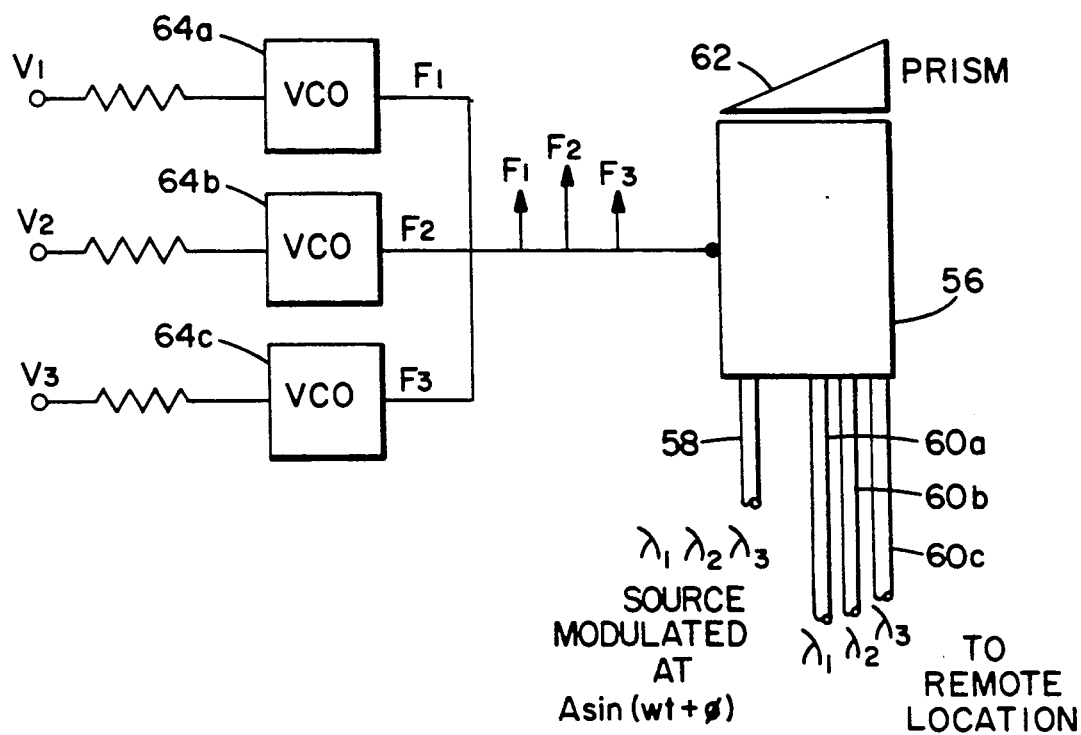
FIG. 4 is a block diagram showing an optical multiplexer coupled to voltage to frequency converted outputs of a focal plane array, the multiplexer accomplishing a wavelength division multiplexing in the frequency domain.

In reference now to FIGS. 3 and 4 there is illustrated, in accordance with the invention, an optical link which employs wavelength division multiplexing in the time domain and an optical link which employs wavelength division multiplexing in the frequency domain, respectively. In general, wavelength division multiplexing involves coupling optical power from sources having different wavelengths onto a single optical fiber. In so doing the information carrying capacity of the fiber is more fully utilized. In accordance with the invention wavelength division multiplexing is used in conjunction with a waveguide modulator, such as a lithium niobate device, to convey information signals generated by focal plane radiation detectors to a remote location or locations where signal processing is performed.

In FIG. 3 there is shown three representative voltage outputs ($V_1$, $V_2$ and $V_3$) from a FPA 50, the voltage outputs being sequentially multiplexed, shown schematically as a switch 52, onto an electrical conductor 54. Electrical conductor 54 is coupled to an optical multiplexer/demultiplexer device 56 which is comprised of electro-optic material operable for inducing a phase change of a sinusoidal optical input signal 58, the input signal having a frequency of $A\sin(\omega t+\phi)$. The input optical signal includes a plurality of wavelengths, the number of wavelengths being at least equal to the number of information sources. In this example there are three sources of information, corresponding to $V_1$, $V_2$ and $V_3$, and three input wavelengths. A plurality of output fibers 60a, 60b and 60c are provided for conveying the three wavelengths individually to a remote location for subsequent detection and signal processing. A wavelength sensitive device, such as a prism 62, is coupled to the device 56 for selectively directing each of the wavelengths of radiation into its associated output fiber. As can be seen, each of the voltages typically has a different amplitude resulting in the phase components of each of the radiation output signals being different. As will be recalled, it is the phase term of the carrier which is modulated by the electro-optic device, resulting in the conveying of information to the signal processor.

The embodiment of FIG. 4 is similar to that of FIG. 3 except that each of the voltages $V_1$, $V_2$ and $V_3$ are converted to a frequency by a voltage controlled oscillator (VCO) 64a, 64b and 64c. The frequency output of each VCO 64 is a function of the magnitude of the input voltage and a transfer function. Due to the multiplexing of the voltage signals each frequency is applied individually to the device 56, the phase term being modulated at a frequency which is function of the magnitude of the voltage outputs of the FPA 50. Each frequency is subsequently detected and converted to a value indicative of the magnitude of the corresponding voltage during that particular sampling period.

For an application wherein a particularly high signal to noise ratio is desired the interferometer or the Y-junction of the $LiNbO_3$ electro-optic device 32 is preferably designed to match the output characteristic of the VCO 64. Typically, for a demanding signal to noise application synthetic heterodyne demodulation is employed as will be described. Inasmuch as the signal frequency is tracked, a VCO center frequency match or relationship with the carrier frequency is not required.

Referring to FIG. 5 there is shown, in accordance with an aspect of the invention, a phase modulator 70 including a Mach Zehnder interferometer. The modulator 70 is constructed with a modulation constant to provide a sufficient amount of phase shift for a given number (N) bits of resolution. Furthermore, based on the signal to noise ratio of the system, a minimum detectable signal voltage is achieved for a given application. As an example, for a system noise floor of 500 microvolts the minimum signal voltage detectable by the modulator 70 is in excess of 500 microvolts for a system bandwidth related to the detector sampling rate. In accordance with one aspect of the invention the modulator 70 is operated in push-pull to achieve an approximate factor of two increase in the amount of phase modulation for a given input.

For the modulator 70 of FIG. 5 having a voltage pulse $V_{sig}$ 72 applied thereto it can be shown that $$P = \frac{Po\gamma'}{2} (1 + \cos(2\phi(v))); \quad (2)$$

$$P = \frac{Pd}{2} [1 + \cos[2KV_{sig} + \phi_{DC}]]; \text{ and} \quad (3)$$

$$P = \frac{Pd}{2} [1 + \sin(2KV_{sig})] \quad (4)$$

where $Pd = Po\,\gamma'$, $\phi_{DC} = -\pi/2$ and K is the modulation constant.

A graphical representation of these conditions for a plurality of $V_{sig}$ pulses is shown in FIG. 6a and the conditions for each pulse is shown in FIG. 6b. In FIGS. 6a and 6b 2 $KV_{sig(max)}$ is less than $\phi_{max}$.

In general, the modulator 70 is readily adaptable to at least two signal detection and processing methodologies. These include phase locked loop homodyne detection and synthetic heterodyne detection (or phase tracking), both detection schemes operating at quadrature. For those applications having a minimum detectable signal which is approximately 500 microvolts synthetic heterodyne detection may be a preferred technique in that this detection scheme permits phase tracking of the signal beyond the linear region of a sine wave. This results in an increase in the modulation constant and a smaller minimum detectable signal.

Figure 7A:
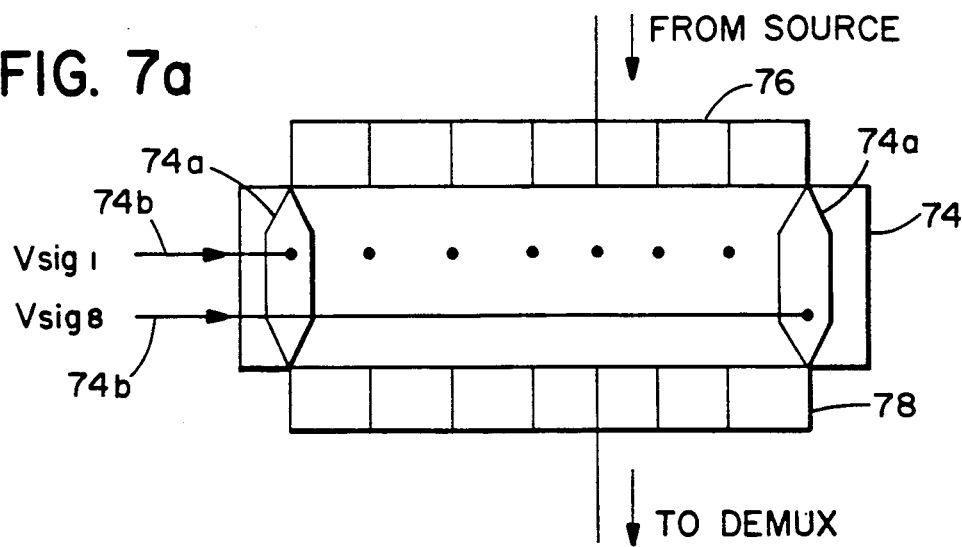
FIG. 7a shows an electro-optic device which includes a plurality of Mach Zehnder interferometers and further including an input star coupler and an output star coupler, each of the interferometers receiving a voltage signal from a FPA.

FIG. 7a shows, in accordance with one embodiment of the invention, wavelength division multiplexing being accomplished with a single lithium niobate device 74 which includes a plurality of Mach Zehnder interferometers 74a, for example eight. Radiation from a source is launched into an eight port star coupler 76, the coupler 76 feeding the eight interferometers 74a which share a common circuit ground. Each interferometer 74a is constructed to be wavelength selective to radiation within a different, narrow range of wavelengths. Outputs from the eight interferometers 74a are input into another eight port star coupler 78 and are launched into a single optical fiber for transmission to signal processing electronics located outside of the cold stage. Each interferometer is coupled to an associated, relatively short, electrical conductor 74b which conveys a signal ($V_{sig1} - V_{sig8}$) from a set of radiation detectors of a focal plane array of radiation detectors (not shown). Inasmuch as all eight electrical conductors 74b typically are each conveying an electrical signal the provision of eight separate interferometers provides the required bandwidth. Of course, the number of interferometers and star coupler ports per modulator device 74 is application specific and may comprise either fewer or more than the eight shown in FIG. 7a.

Figure 7B:
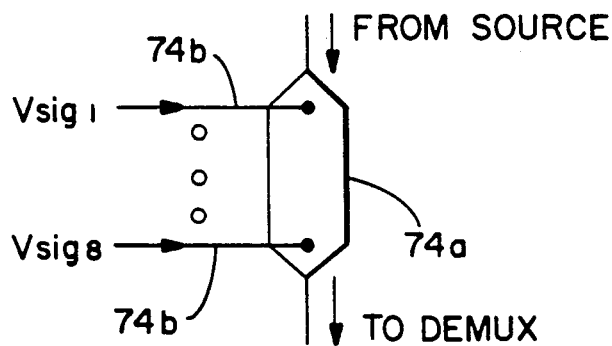
FIG. 7b shows a single Mach Zehnder interferometer receiving a plurality of FPA voltage outputs.

It should be noted that at any given time seven of the eight electrical conductors may be settling during a time when the remaining conductor is active. If the focal plane electronics are designed such that these conductors settle at a voltage which is less than the shot noise limit, that is less than the minimum detectable voltage, for a time "t", then wavelength division multiplexing with eight interferometers may be replaced with only a single time domain interferometer 74a as illustrated in FIG. 7b.

Figure 8A:
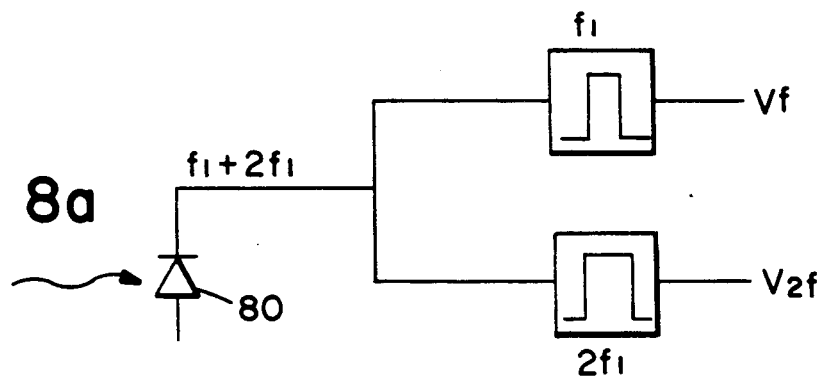
FIG. 8a is simplified block diagram of a synthetic heterodyne demodulator for demodulating a wavelength division multiplexed optical carrier.

The previously mentioned synthetic heterodyne method of detection will now be described in reference to FIG. 8. FIG. 8a is a simplified block diagram showing a signal detector 80 and two outputs $V_f$ and $V_{2f}$. The magnitudes of $V_f$ and $V_{2f}$ may be determined as follows:

$$V = \frac{GRPo}{2}(1 + \cos(2KVs + KVo\sin 2\pi ft)), \quad (5)$$

$$V_{dc} = \frac{GRPo}{2}(1 + J_o(KVo)), \quad (6)$$

$$V_f = \frac{-GRPo}{2}(J_1(KVo)\sin(2KVs)\sin 2\pi ft), \text{ and} \quad (7)$$

$$V_{2f} = \frac{GRPo}{2}(J_2(KVo)\cos(2KVs)\cos 2\pi ft) \quad (8)$$

where G is the transimpedance.

Figure 8C:
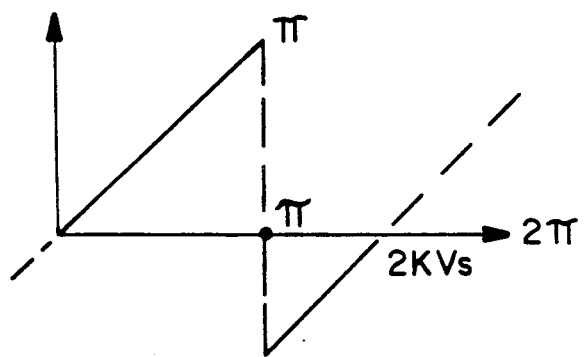
FIG. 8c is a graphical representation of the operation of the demodulator of FIG. 8b.
Figure 8B:
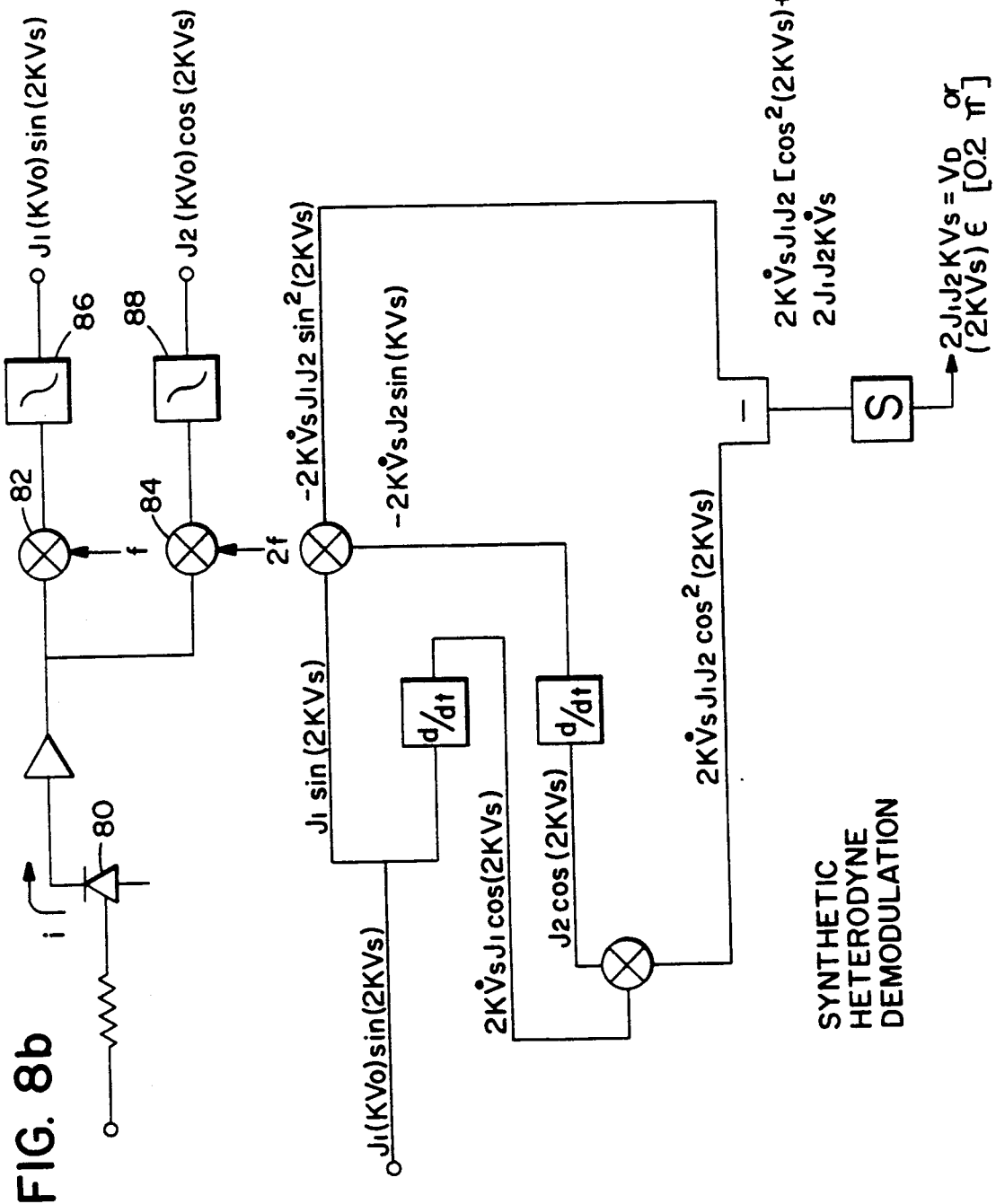
FIG. 8b is a block diagram which shows the demodulator of FIG. 8a in greater detail.

FIG. 8b shows in greater detail that the phase modulated signal is received by detector 80 and is applied to two mixers 82 and 84. Mixer 82 has as an input the first harmonic (f) of the carrier frequency while mixer 84 has as an input the second harmonic (2f). The outputs of the mixers 82 and 84 are applied to low pass filters 86 and 88, respectively; each of the low pass filters having a bandwidth of, for example, 20 MHz. The remainder of the synthetic heterodyne circuit shown in FIG. 8b functions in general to multiply the derivative of the first harmonic signal by the derivative of the second, and vice versa, and to take the difference of the derivatives. The final output, $2J_1J_2KV_s$, can be seen to be equal to the output voltage of a FPA detector $V_d$, which is the desired result. FIG. 8c illustrates this technique in graphical form.

Figure 8D:
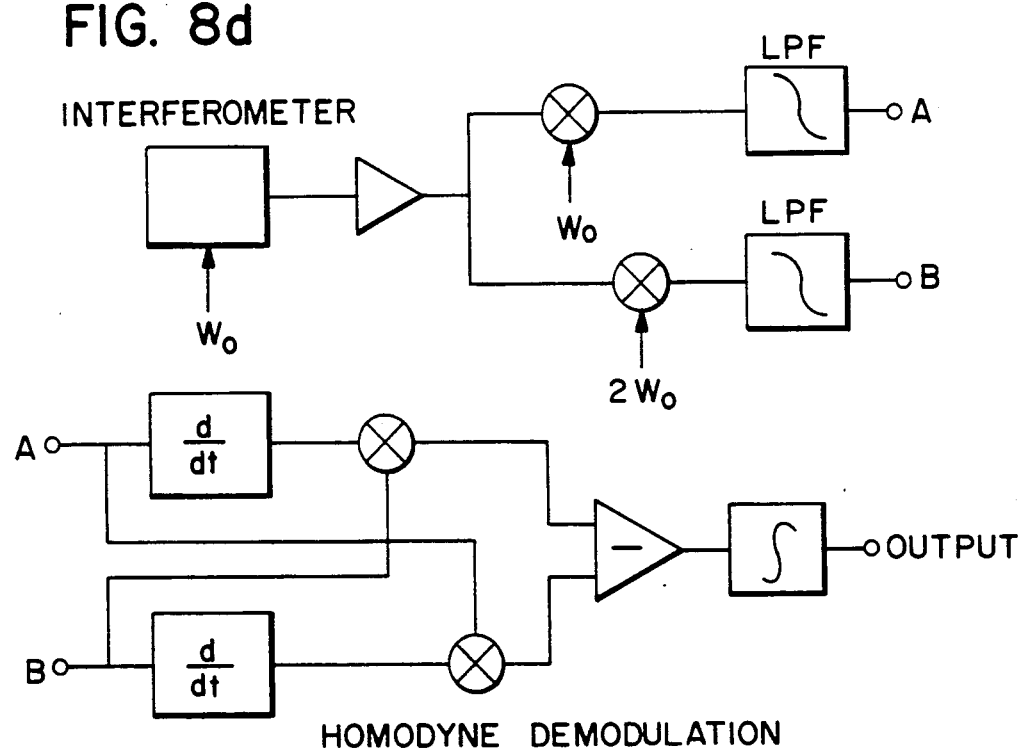
FIG. 8d is a block diagram which illustrates a homodyne demodulator.

In FIG. 8d there is illustrated in block diagram form a homodyne demodulator which may be employed to demodulate the image sensor information which is encoded upon the phase component of the sinusoidal carrier.

As previously stated, synthetic heterodyne detection permits phase tracking beyond the linear portion of the carrier sine wave, resulting in an increase in K, an improved signal to noise ratio and a smaller, by approximately 25 per cent, detectable signal voltage as compared to homodyne detection. However, for many applications homodyne detection may be preferred due to its relatively less complex circuitry.

Figure 9:
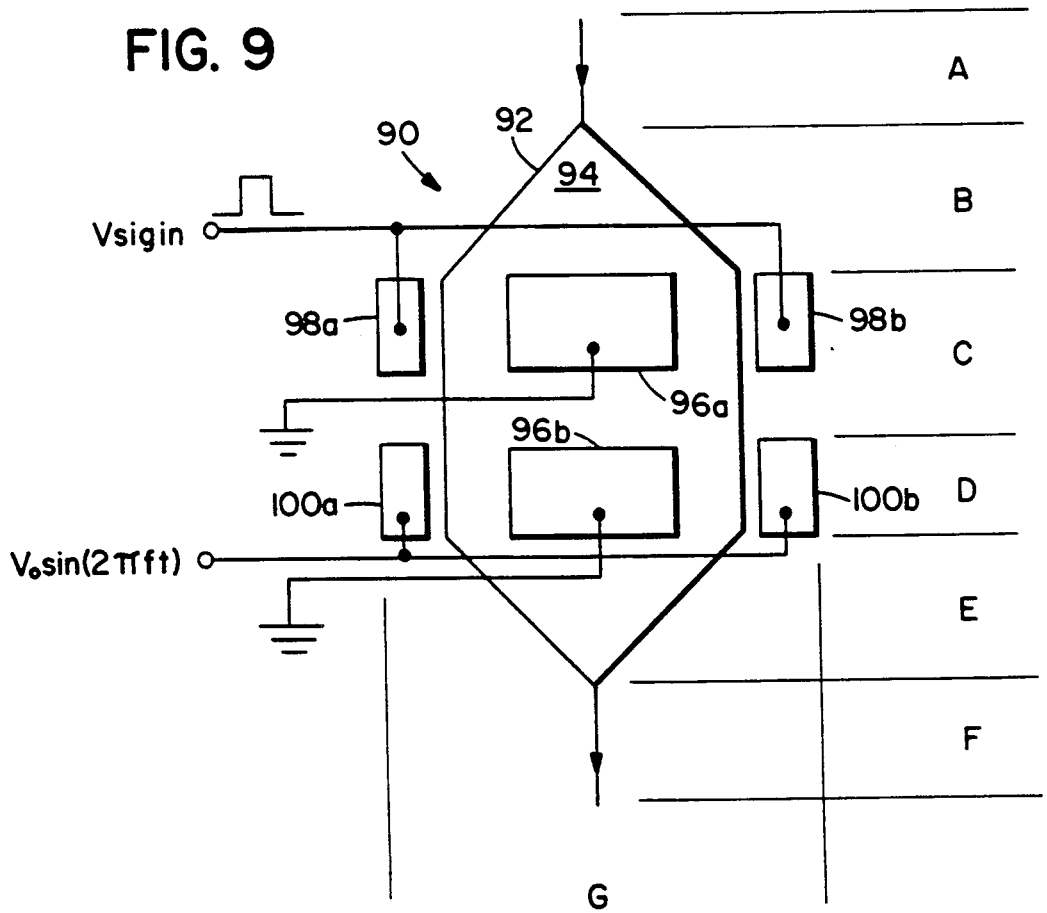
FIG. 9 shows an interferometer for use in the wavelength division multiplexing of an optical carrier.

Referring now to FIG. 9 there is shown an illustrative modulator 90 having a Mach Zehnder interferometer 92 fabricated thereon, the modulator operating in push-pull. Interferometer 92 comprises an optical waveguide structure having input and output portions and a substantially hexagonal shaped portion interposed therebetween. Interferometer 92 further includes a plurality of electrodes formed upon a surface of a substrate 94; the substrate being comprised of electro-optic material such as lithium niobate. The electrodes may comprise titanium which is vapor deposited by known techniques upon the substrate 94 in the desired pattern. Two signal ground electrodes 96a and 96b are provided as well as two pairs of signal electrodes 98a, 98b and 100a, 100b. A focal plane output voltage potential $V_{sigin}$ is applied to signal electrodes 98a and 98b. A first harmonic of the carrier frequency $Vo\sin(2\pi ft)$ is applied to signal electrodes 100a and 100b. The output of interferometer 92 is coupled to a fiber cable and is conveyed to, for example, the synthetic heterodyne apparatus of FIG. 8 for determination of the magnitude of $V_{sigin}$. Representative dimensions of the interferometer 92 are given in the following table.

| Designator | Dimension (cm) |
| --- | --- |
| A | 0.5 |
| B | 1.0 |
| C | 0.5 |
| D | 1.0 |
| E | 1.0 |
| F | 0.5 |
| G | 0.02 |

A number of such interferometer structures may be fabricated on a common substrate, as illustrated in FIG. 7a.

Push-pull operation is achieved by fast axis or slow axis coupling of an input fiber to the interferometer 92. For example, fast axis coupling results in a positive phase shift in each of the interferometer 92 arms. Due to a trigonometric expansion of a cosine function a positive and a negative phase shift occurs, resulting in push-pull operation. The interferometer 92 is responsive to a signal of approximately 500 microvolts to approximately two volts and has a bandwidth of approximately 160 MHz.

It should be realized that illustrative embodiments of the invention have been disclosed above and that those having skill in the art may derive modifications to these embodiments. The invention is therefore not to be considered to be limited to only these illustrative embodiments but is instead intended to be limited only by the scope of the appended claims.

What is claimed is:

1. Apparatus for coupling an output signal of a radiation detector to a signal measurement apparatus comprising:
   means for providing an optical carrier signal having a frequency component and a phase component associated therewith;
   means, coupled to an output of the carrier providing means and to an output signal of a radiation detector, for varying the phase component of the carrier signal as a function of a magnitude of the radiation detector output signal;
   means, coupled to an output of the phase varying means, for conveying the carrier signal, including the phase component, therefrom; and
   means, coupled to said conveying means and responsive to the phase component of the carrier signal, for generating an output signal having a characteristic which is a function of the magnitude of the radiation detector output signal.

2. Apparatus as set forth in claim 1 wherein the means for varying the phase component of the carrier signal is an electro-optic device.

3. Apparatus as set forth in claim 2 wherein the conveying means includes at least one fiber optic cable.

4. Apparatus as set forth in claim 3 wherein the carrier providing means comprises a sinusoidal source of radiation.

5. Apparatus as set forth in claim 2 wherein the means for varying the phase component of the carrier signal includes at least one optical waveguide means.

6. Apparatus as set forth in claim 5 wherein the means for varying the phase component of the carrier signal further includes at least one interferometer means.

7. An optical link for coupling one or more output signals from an array of radiation detectors to one or more signal receiving and processing devices, comprising:
   a carrier signal generated by a source of optical radiation having at least one characteristic frequency component and a phase component associated therewith;
   first means for coupling the carrier signal from the source;
   phase modulating means having at least one first input coupled to an output signal from an array of radiation detectors and a second input coupled to the carrier coupling means for receiving the carrier signal therefrom, the phase modulating means being responsive to the array output signal for modulating the phase component of the carrier signal in accordance therewith;
   second means for coupling the phase modulated carrier signal from the phase modulating means; and
   means, coupled to the phase modulated carrier coupling means, for demodulating the carrier signal, the demodulating means having an output signal which is expressive of a characteristic of the output signal from the array of radiation detectors.

8. An optical link as set forth in claim 7 wherein the first and the second means for coupling each comprise at least one fiber optic cable.

9. An optical link as set forth in claim 8 wherein the phase modulating means comprises an electro-optic waveguide structure.

10. An optical link as set forth in claim 9 wherein the electro-optic waveguide structure comprises a 50—50 Y-junction device having a fiber optic cable coupled to each arm of the Y-junction for redundantly outputting two substantially identical phase modulated carrier signals.

11. An optical link as set forth in claim 9 wherein the electro-optic waveguide structure comprises at least one interferometer structure.

12. An optical link as set forth in claim 11 wherein the interferometer structure is a Mach Zehnder type of interferometer structure.

13. An optical link as set forth in claim 9 wherein the phase modulating means is comprised of lithium niobate.

14. An optical link as set forth in claim 8 wherein the source of optical radiation comprises a super-luminescent diode, wherein the first and the second coupling means are a single mode, polarization preserving type of optical fiber, and wherein the demodulating means comprises at least one detector comprised of Group III–V material.

15. An optical link as set forth in claim 8 wherein the source of optical radiation comprises a light emitting diode, wherein the first and the second coupling means are a germanium doped single mode type of optical fiber, and wherein the demodulating means comprises at least one detector comprised of Group II–VI material.

16. An optical link as set forth in claim 8 wherein the source of optical radiation generates a plurality of different wavelengths of radiation, wherein the second coupling means comprises a plurality of output optical fibers individual ones of which couple one of the wavelengths from the phase modulating means, and wherein the phase modulating means comprises a wavelength selective radiation directing means for directing radiation of different wavelengths into an associated one of the plurality of output optical fibers.

17. An optical link as set forth in claim 16 wherein the radiation directing means comprises a prism means disposed to selectively reflect the different wavelengths into the associated one of the plurality of output optical fibers.

18. An optical link as set forth in claim 7 and further comprising a voltage to frequency converting means coupled between the array output signal and the phase modulation means for converting a voltage signal output of the array to a frequency signal output, the phase modulating means phase modulating the carrier signal in response to the frequency signal output.

19. An optical link as set forth in claim 8 wherein the demodulating means includes a synthetic heterodyne demodulator for demodulating the phase component of the carrier signal.

20. An optical link as set forth in claim 8 wherein the demodulating means includes a homodyne demodulator for demodulating the phase component of the carrier signal.

21. A phase modulator for modulating a phase component of a substantially sinusoidal optical carrier signal in accordance with an input signal generated by a radiation detecting array, comprising
a substrate comprised of electro-optic material; and
at least one interferometer fabricated on the substrate, the interferometer comprising:
an optical waveguide having a substantially linear input portion having an exterior end and an interior end, the input portion for coupling an optical carrier signal into the interferometer, a substantially linear output portion having an interior end and an exterior end, the input and output portions being substantially colinear one with the other, and a substantially hexagonal portion interposed between the interior ends of the input and output portions, the hexagonal portion having one corner coupled to the interior end of the linear input portion and an oppositely opposed corner coupled to the interior end of the linear output portion;
at least one signal ground electrode disposed within a perimeter of the hexagonal portion; and
at least one pair of signal electrodes individual ones of which are disposed on opposite sides of the hexagonal structure such that the signal ground electrode is disposed between the pair of signal electrodes, each of the signal electrodes being coupled in common to at least one output signal generated by a radiation detector.

22. A phase modulator as set forth in claim 21 and further comprising:
a second signal ground electrode disposed within the perimeter of the hexagonal portion; and
a second pair of signal electrodes individual ones of which are disposed on opposite sides of the hexagonal portion such that the second signal ground electrode is disposed between the second pair of signal electrodes, each of the second pair of signal electrodes being coupled in common to a frequency signal having a frequency which is a function of the optical carrier frequency.

23. A phase modulator as set forth in claim 22 wherein the substrate is comprised of lithium niobate.

24. A phase modulator as set forth in claim 23 wherein the signal ground electrodes and signal electrodes are comprised of titanium.

25. A phase modulator as set forth in claim 22 wherein the interferometer is a Mach Zehnder type of interferometer.

26. A method for coupling an output signal of a radiation detector to a signal measurement apparatus comprising the steps of:
providing an optical carrier signal having a frequency component and a phase component associated therewith;
varying the phase component of the carrier signal as a function of a magnitude of the radiation detector output signal;
redundantly transmitting the carrier signal to one or more remote locations; and
responsive to the phase component of the carrier signal,
generating at the one or more remote locations an output signal having a magnitude which is a function of the magnitude of the radiation detector output signal.

27. A method as set forth in claim 26 wherein the step of varying the phase component of the carrier signal is accomplished with an electro-optic device.

28. A method as set forth in claim 27 wherein the step of transmitting is accomplished with at least one fiber optic cable.

29. A method as set forth in claim 27 wherein the step of varying the phase component of the carrier signal further includes a step of applying the carrier signal to at least one interferometer means.

30. A method as set forth in claim 29 wherein the step of varying the phase component is accomplished by operating the interferometer means in push-pull.

31. A method for coupling one or more output signals from an array of radiation detectors to one or more signal receiving and processing devices, comprising the steps of:
generating an optical radiation carrier signal having at least one characteristic frequency component having a phase component associated therewith;
coupling the carrier signal to a phase modulator;
phase modulating the carrier signal in accordance with a characteristic of a radiation detector output signal;
coupling the phase modulated carriers signal to a phase demodulator; and
demodulating the carrier signal to generate a signal which is expressive of a magnitude of the output signal from the array of radiation detectors, wherein the step of coupling the phase modulated carrier signal is accomplished by redundantly conveying two or more substantially identical phase modulated carrier signals.

32. A method as set forth in claim 31 wherein the step of phase modulating is accomplished with an electro-optic waveguide structure having a 50—50 Y-junction device including a fiber optic cable coupled to each arm of the Y-junction.

33. A method as set forth in claim 31 wherein the step of demodulating is accomplished by a homodyne demodulator.

34. A method as set forth in claim 31 wherein the step of phase modulating is accomplished with a Mach Zehnder type of interferometer.

35. A method as set forth in claim 31 wherein the step of generating generates a plurality of different wavelengths of radiation, and wherein the step of phase modulating includes a step of directing radiation of different wavelengths into an associated one of a plurality of output optical fibers.

36. A method as set forth in claim 31 wherein the step of phase modulating includes a first step of converting the radiation detector output signal to a frequency signal.

37. A method as set forth in claim 31 wherein the step of demodulating is accomplished by a synthetic heterodyne demodulator.

* * * * *